US008761615B2

(12) United States Patent
Lee

(10) Patent No.: US 8,761,615 B2
(45) Date of Patent: Jun. 24, 2014

(54) IMAGE FORMING APPARATUS, HOST DEVICE AND PRINT CONTROLLING METHOD

(75) Inventor: Dong-hoon Lee, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 627 days.

(21) Appl. No.: 12/926,566

(22) Filed: Nov. 24, 2010

(65) Prior Publication Data

US 2011/0299859 A1 Dec. 8, 2011

(30) Foreign Application Priority Data

Jun. 3, 2010 (KR) ........................ 10-2010-0052412

(51) Int. Cl.
*G03G 15/00* (2006.01)
*G06K 15/00* (2006.01)
*G06F 15/16* (2006.01)
*G06F 11/00* (2006.01)

(52) U.S. Cl.
USPC ................ 399/8; 358/1.18; 709/200; 714/25; 714/44

(58) Field of Classification Search
USPC ........... 399/8; 358/1.18; 709/200; 714/25, 44
See application file for complete search history.

(56) References Cited

U.S. PATENT DOCUMENTS

2009/0013065 A1* 1/2009 Nagashima .................. 709/223
2009/0080011 A1 3/2009 Shen
2010/0100588 A1* 4/2010 Huster ......................... 709/203

FOREIGN PATENT DOCUMENTS

JP 9-218843 8/1997

* cited by examiner

*Primary Examiner* — Doulgas Tran
*Assistant Examiner* — Justin Katzwhite
(74) *Attorney, Agent, or Firm* — Staas & Halsey LLP

(57) ABSTRACT

An image forming apparatus is provided. The image forming apparatus includes a search unit which broadcasts a search message for searching for a connectable host device, a communication interface unit which receives a response message for notifying that a print job is executable from host devices in response to the search message, a user interface unit which displays host devices corresponding to the received response message and receives a selection from a user regarding a host device to be connected from among the displayed host devices, and a controller which controls the communication interface unit to transmit a connection message for requesting connection with the image forming apparatus to the selected host device.

22 Claims, 14 Drawing Sheets

FIG. 5

| Request | Version | IP version | Printer IP | Model Name | Printer Location | User Name | Pin Number | Reseverd |
|---|---|---|---|---|---|---|---|---|
| 0x20 | 0x01 | v4 | 10.88.194.22 | CLX6200 | R4 | 0000 | 0000 | |

FIG. 6A

| Reply Device | Version | IP version | Host IP | Port Number | PC Name | User Name | Pin Number | Reseverd |
|---|---|---|---|---|---|---|---|---|
| 0x3d | 0x1 | v4 | 10.88.192.33 | 6000 | Jim's PC | Jim | xxxxxxx | |

FIG. 6B

| Reply Device | Version | IP version | Host IP | Port Number | Phone Number | User Name | Pin Number | Reseverd |
|---|---|---|---|---|---|---|---|---|
| 0x4d | 0x1 | v4 | 10.88.193.35 | 6000 | 010-0000-0000 | James | xxxxxx | |

FIG. 7

| Request | Version | IP version | Printer IP | Model Name | Printer Location | User Name | Pin Number | Reseverd |
|---|---|---|---|---|---|---|---|---|
| 0x70 | 0x01 | v4 | 10.88.194.22 | CLX6200 | R4 | 0000 | 0000 | |

FIG. 8

| Reply | Version | IP version | Printer IP | Model Name | Setting Status | Error Code | Reseverd |
|---|---|---|---|---|---|---|---|
| 0x80 | 0x01 | v4 | 10.88.194.22 | CLX6200 | 01 | 0000 | |

IMAGE FORMING APPARATUS, HOST DEVICE AND PRINT CONTROLLING METHOD

CROSS-REFERENCE TO RELATED APPLICATIONS

This application claims priority benefit from Korean Patent Application No. 10-2010-052412, filed in the Korean Intellectual Property Office on Jun. 3, 2010, the disclosure of which is incorporated herein by reference.

BACKGROUND

1. Field

Aspects of the exemplary embodiments relate to an image forming apparatus, a host device and a print controlling method, and, more particularly, to an image forming apparatus which is capable of searching a host device and connecting to the searched host device, and a host device and a print controlling method thereof.

2. Description of the Related Art

In general, an image forming apparatus refers to an apparatus which prints print data generated by a print controlling terminal, such as a computer, on a recording paper, and examples of such an image forming apparatus include a copier, a printer, a fax machine, and a multi-function peripheral (MFP) which combines the functions of the aforementioned apparatuses into one apparatus.

Before a print controlling terminal performs a print job using an image forming apparatus, the print controlling terminal should be connected to the image forming apparatus.

Conventionally, the print controlling terminal searches for a connectable image forming apparatus, selects one of the searched or found image forming apparatuses, and connects to the selected image forming apparatus.

Recently, with the development of a mobile print environment, a print job is often performed in a new environment, and usually there are a plurality of connectable image forming apparatuses in an office or a campus environment. In order to select an image forming apparatus to connect, a user should have information on a model name or an IP address of the image forming apparatus to connect.

If the user does not know the model name or an IP address of the image forming apparatus to which to connect, the user should access the image forming apparatus to identify its model name and IP address, and this causes inconvenience to the user.

SUMMARY

Aspects of the exemplary embodiments relate to an image forming apparatus which is capable of searching for a host device and connecting to the searched or found host device, and a host device and a print controlling method thereof.

An image forming apparatus, according to an exemplary embodiment, includes a search unit which broadcasts a search message for searching for a connectable host device, a communication interface unit which receives a response message for notifying that a print job is executable from host devices in response to the search message, a user interface unit which displays host devices corresponding to the received response message and receives a selection from a user regarding a host device to be connected from among the displayed host devices, and a controller which controls the communication interface unit to transmit a connection message for requesting connection with the image forming apparatus to the selected host device.

The search message may include at least one of model information and network address information of the image forming apparatus.

The response message may include at least one of network address information, apparatus name and user name of a host device.

The connection message may include a command to set the image forming apparatus as a basic or default printer of the selected host device.

At least one of the search message, the response message and the connection message may include a user datagram protocol (UDP).

A host device which is connectable to an image forming, according to an exemplary embodiment, includes a communication interface unit which receives a search message for requesting information regarding the host device from the image forming apparatus, a determination unit which determines whether it is possible to perform a print job using an image forming apparatus which sent the search message, a controller which controls the communication interface unit to transmit a response message including information regarding the host device to the image forming apparatus according to the determination result, and a setting unit which sets the image forming apparatus as a basic printer of the host device if a connection message for requesting connection is received from the image forming apparatus.

The determination unit may determine whether it is possible to perform a print job based on whether a driver installed in the host device supports the image forming apparatus.

The host device may further include a driver unit which generates print data that is recognizable in the image forming apparatus if a print command is received, and the controller may control the communication interface unit to transmit the generated print data to the image forming apparatus.

The host device may further include a user interface unit which, if a connection message for requesting connection is received from the image forming apparatus, displays a message for notifying that there is a connection request and receives a selection regarding whether to connect to the image forming apparatus from a user, and may set the image forming apparatus as a basic printer of the host device and automatically set a network IP address and port of an image forming apparatus set in a driver according to the connection result.

A print controlling method in an image forming apparatus, according to an exemplary embodiment, includes broadcasting a search message to search for a connectable host device, receiving a response message for notifying that it is possible to perform a print job from host devices in response to the search message, displaying host devices corresponding to the received response message, receiving a selection regarding a host device to be connected from among the displayed host devices, and transmitting a connection message for requesting connection of the image forming apparatus to the selected host device.

The search message may include at least one of model information and network address information of the image forming apparatus.

The response message may include at least one of network address information, apparatus name and user name of a host device.

The connection message may include a command to set the image forming apparatus as a basis printer of the selected host device.

At least one of the search message, the response message and the connection message may include a user datagram protocol (UDP).

A print controlling method in a host device connectable to an image forming apparatus, according to an exemplary embodiment, includes receiving a search message for requesting information regarding the host device from the image forming apparatus, determining whether it is possible to perform a print job using an image forming apparatus which sent the search message, transmitting a response message including information regarding the host device to the image forming apparatus according to the determination result, and setting the image forming apparatus as a basic printer of the host device if a connection message for requesting connection is received from the image forming apparatus.

The determining may include determining whether it is possible to perform a print job based on whether a driver installed in the host device supports the image forming apparatus.

The method may further include generating print data that is recognizable in the image forming apparatus if a print command is received and transmitting the generated print data to the image forming apparatus.

The method may further include, if a connection message for requesting connection is received from the image forming apparatus, displaying a message for notifying that there is a connection request and receiving a selection regarding whether to connect to the image forming apparatus, and the setting may include setting the image forming apparatus as a basic printer of the host device and automatically setting a network IP address and port of an image forming apparatus set in a driver, according to the connection result.

BRIEF DESCRIPTION OF THE DRAWINGS

The above and/or other aspects of the present disclosure will be more apparent by describing certain present disclosure with reference to the accompanying drawings, in which:

FIGS. 5 to 8 are views illustrating an example of a message structure according to an exemplary embodiment;

DETAILED DESCRIPTION

Figure 1:
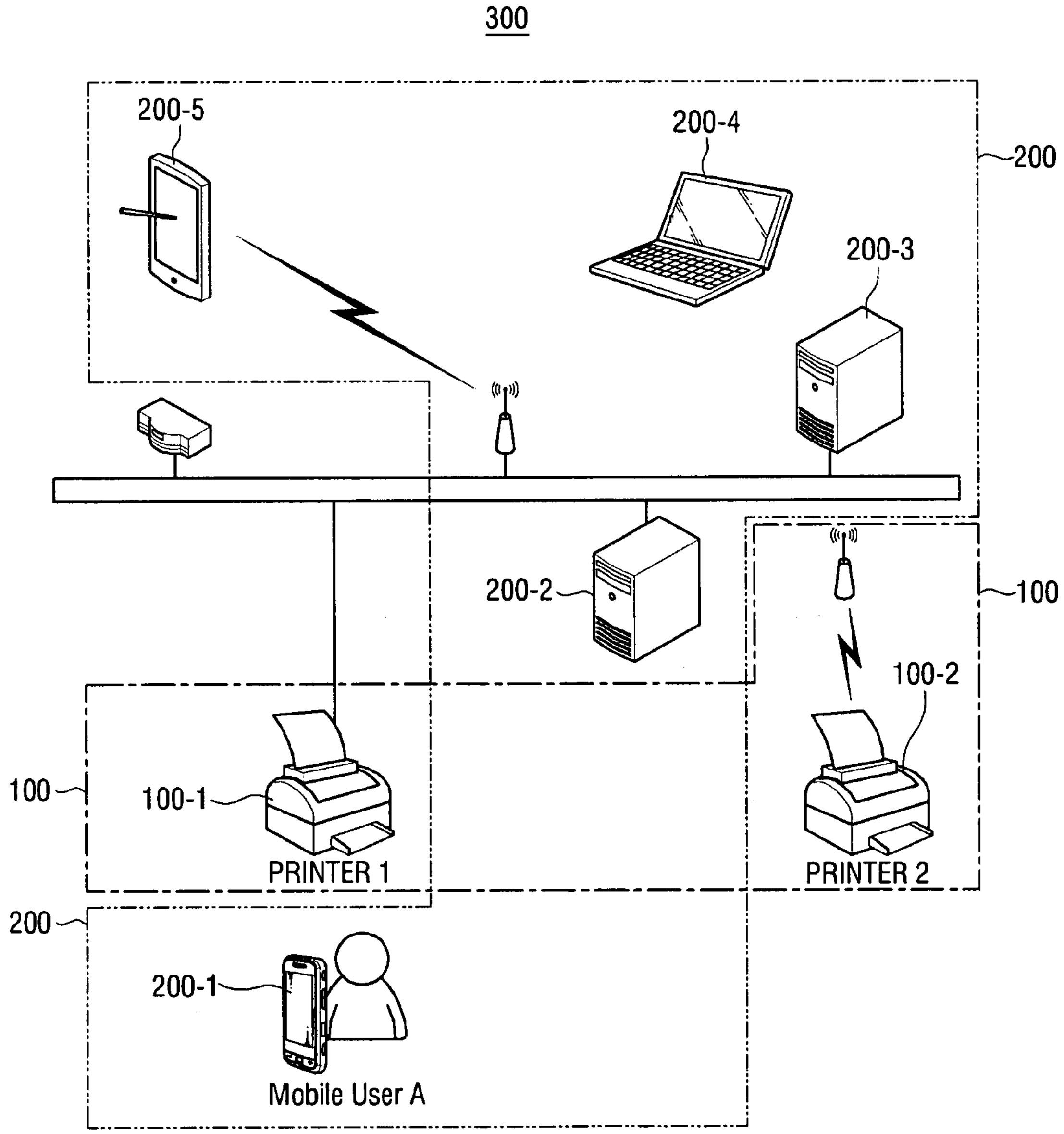
FIG. 1 is a block diagram illustrating a print controlling system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a print controlling system according to an exemplary embodiment.

Referring to FIG. 1, a print controlling system 300 includes a plurality of image forming apparatuses 100-1, 100-2, and a plurality of host devices 200-1, 200-2, 200-3, . . . , **200-*n***.

Figure 2:
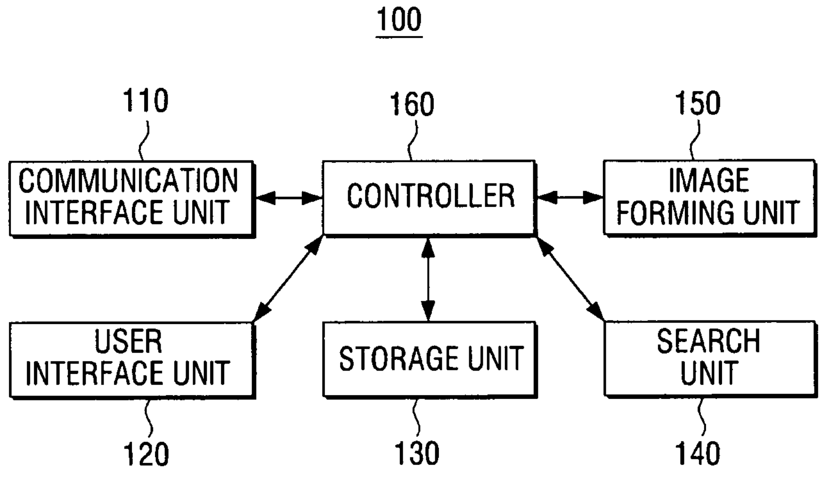
FIG. 2 is a block diagram illustrating a detailed structure of the image forming apparatus in FIG. 1.

An image forming apparatus 100 in FIG. 2 searches a plurality for connectable host devices 200-1, 200-2, 200-3, . . . , **200-*n*, and connects to one host device from among the searched or found plurality of host devices to perform a print job. The detailed structure and operation of the image forming apparatus 100 will be explained later with reference to FIG. 2**.

A host device 200 provides information on the host device 200 to the image forming apparatus 100 and automatically sets the image forming apparatus 100 as a basic or default printer in response to a request from the image forming apparatus 100. The detailed structure and function of the host device 200 will be explained later with reference to FIG. 3. As such, the host device 200 may be a personal computer (PC), a tablet PC, a mobile apparatus, or a mobile phone.

In the above explanation regarding FIG. 1, five host devices 200-1, 200-2, 200-3, . . . , **200-*n* are directly connected to the image forming apparatus 100, but more than five host devices may be connected to the image forming apparatus 100**, and host devices may also be connected indirectly through a router or a management server.

FIG. 2 is a block diagram illustrating a detailed structure of the image forming apparatus 100 in FIG. 1. Referring to FIG. 2, the image forming apparatus 100 may include a communication interface unit 110, a user interface unit 120, a storage unit 130, a search unit 140, an image forming unit 150, and a controller 160.

The communication interface unit 110 may be connected to a plurality of host devices 200-1, 200-2, 200-3, . . . , **200-*n*. Specifically, the communication interface unit 110 connects the image forming apparatus 100 to the host device 200**, and may be connected not only through a local area network (LAN) or an Internet network but also through a universal serial bus (USB). It is understood that a wireless network may available also for the connecting.

In addition, the communication interface unit 110 may transmit a search message to the host devices 200-1, 200-2, 200-3, . . . , **200-*n*. Specifically, the communication interface unit 110 may broadcast a search message generated by the search unit 140 which will be explained later to a plurality of connected host devices 200-1, 200-2, 200-3, . . . , 200-*n*. Herein, the search message refers to a message which requests apparatus information regarding a host device, and may include model information, model name, IP address, and setting place of the image forming apparatus as illustrated in FIG. 5**. However, it is not limited thereto.

In addition, the communication interface unit 110 may receive a response message from the host device 200. Herein, the response message refers to a message generated from the host device, notifying that a print job can be performed, and may include information regarding network address (or IP address or phone address), apparatus name, and/or user name of the host device as illustrated in FIG. 6A illustrates an example of a response packet when a host device is a personal computer, and FIG. 6B illustrates an example of a response packet when a host device is a mobile phone.

In addition, the communication interface unit 110 may transmit a connection message to the host device 200. Specifically, the communication interface unit 110 may transmit a connection message generated under the control of the controller 160 to the host device 200 which is selected by a user. Herein, the connection message refers to a message which requests connection to the host device 200, and may include model information, model name, IP address, and setting place or location of the image forming apparatus as illustrated in FIG. 7.

Furthermore, the communication interface unit 110 may receive a connection completion message from the host device 200. Herein, the connection completion message refers to a message which notifies an image forming apparatus of completion of setting the image forming apparatus 100 as a basic (default) printer in response to the connection message, and may include information illustrated in FIG. 8.

In addition, the communication interface unit 110 may transmit a search message and a connection message to the host device 200 using a user datagram protocol (UDP). Herein, the UDP may have a message structure illustrated in FIG. 4.

The communication interface unit 110 may also receive print data from the host device 200.

The user interface unit 120 has a plurality of function keys through which a user may set or select various functions supported by the image forming apparatus 100, and may display various information provided by the image forming apparatus 100. The user interface unit 120 may be implemented as an apparatus which performs input and output at the same time, such as a touch pad, or may be implemented as an apparatus which combines an input apparatus, such as a mouse and key board, with a display apparatus, such as a CRT monitor, LCD monitor and LED monitor. However, it is not limited thereto.

In addition, the user interface unit 120 displays a searched or found host device. Specifically, the user interface unit 120 may display a host device which is searched for and found by the search unit 140 through a user interface window. The search unit 140 will be explained later. In this case, the user interface unit 120 may also display information regarding the host device included in the received response message. Accordingly, a user may select a host device to be connected from among the displayed host devices. An example of the user interface window will be explained later with reference to FIG. 9.

The storage unit 130 may store information regarding the image forming apparatus 100. Specifically, the storage unit 130 may store information regarding the model name, IP address, and setting place of the image forming apparatus. In addition, the storage unit 130 may store various messages received from a host device. The storage unit 130 may be implemented as an internal storage medium or an external storage medium of the image forming apparatus 100, such as a removable disk including a USB memory, a storage medium connected to a host, and a web server through a network.

The search unit 140 searches a host device which is connectable to the image forming apparatus 100. Specifically, the search unit 140 may generate a search message to search a connectable host device and control the communication interface unit 110 to broadcast the generated search message. In addition, if the search unit 140 receives a response packet from a host device in response to the broadcast search message, the search unit 140 may search for the host device which sent the response packet as a connectable host device.

The image forming unit 150 performs printing. Specifically, the image forming unit 150 may perform printing of print data received through the communication interface unit 110.

The controller 160 may control each component of the image forming apparatus 100. Specifically, if a search command is input from a user, the controller 160 may search for a connectable host device by controlling the search unit 140 to broadcast a search message and receiving a response message. Subsequently, the controller 160 controls the user interface unit 120 to display the connectable host devices, and may select one host device from among the displayed host devices. The controller 160 may control the communication interface unit 110 to transmit a connection message to the selected host device, so that the selected host device may be connected to the image forming apparatus.

If print data is received from the connected host device 200, the controller 160 may control the image forming unit 150 to perform a print job for the received print data.

As described above, the image forming apparatus 100, according to an exemplary embodiment, may search for a host device which can be connected to the image forming apparatus 100 and select one host device from among the searched or found host devices using the name or telephone number of the host device. Therefore, user convenience can be improved.

Figure 3:
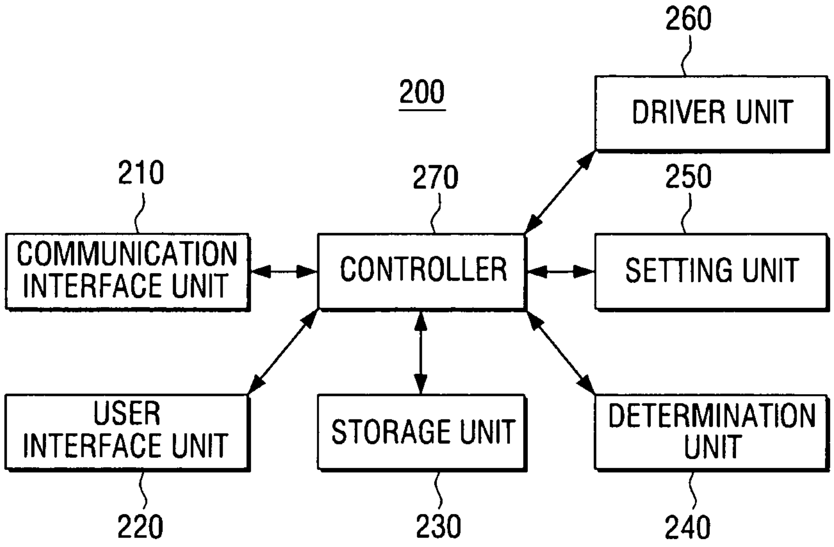
FIG. 3 is a block diagram illustrating a detailed structure of the host device in FIG. 1.

FIG. 3 is a block diagram illustrating a detailed structure of the host device 200 in FIG. 1. Referring to FIG. 3, the host device 200 may include a communication interface unit 210, a user interface unit 220, a storage unit 230, a determination unit 240, a setting unit 250, a driver unit 260, and a controller 270. However, it is not limited thereto.

The communication interface unit 210 may be connected to a plurality of image forming apparatuses 100-1, 100-2. Specifically, the communication interface unit 210 is formed connects the host device 200 to an external apparatus, and may be connected to the plurality of image forming apparatuses 100-1, 100-2 through a local area network (LAN), a wireless network, an Internet network, or through a universal serial bus (USB) port.

In addition, the communication interface unit 210 may receive a search message and a connection message from the image forming apparatus 100. The communication interface unit 210 may also transmit a response message to the image forming apparatus 100. Specifically, the communication interface unit 210 may transmit a response message to 'the image forming apparatus 100 which sent the search message' in accordance with the determination result by the determination unit 240 which will be explained later.

Subsequently, the communication interface unit 210 may transmit a connection completion message to the image forming apparatus 100. Specifically, if connection setting is completed, the communication interface unit 210 may transmit a connection completion message to 'the image forming apparatus 100 which sent the connection message'.

Figure 4:
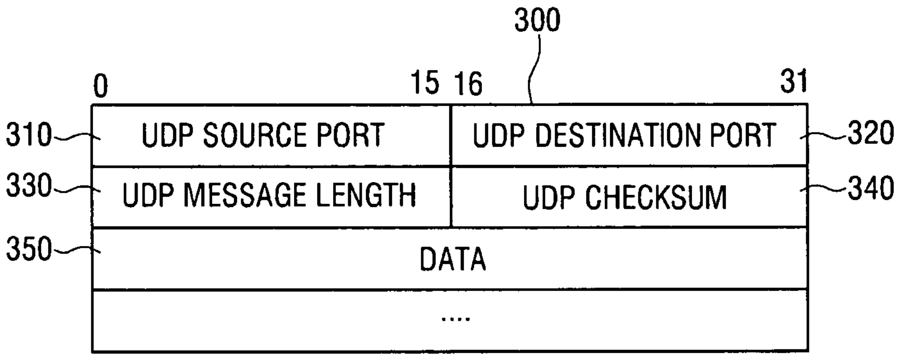
FIG. 4 is a view illustrating a UDP message structure.

The communication interface unit 210 may transmit a response message and a connection completion message to the image forming apparatus 100 using a user datagram protocol (UDP). Herein, the UDP has a message structure as illustrated in FIG. 4. In addition, the communication interface unit 210 may transmit print data to the image forming apparatus 100 of which connection setting is completed.

The user interface unit 220 has a plurality of function keys through which a user may set or select various functions supported by the host device 200, and may display various information provided by the host device 200. The user interface unit 220 may be implemented as an apparatus which performs input and output at the same time, such as a touch pad, or may be implemented as an apparatus which combines a mouse and a monitor according to an aspect.

If a connection message is received, the user interface unit 220 may display a message for notifying that there is a connection request. Specifically, if a connection message for requesting connection is received, the user interface unit 220 may display that there is a connection request from a specific image forming apparatus. In this case, the user interface unit 220 may also display information regarding the image forming apparatus included in the connection message. Accordingly, a user may select whether to connect to the image forming apparatus.

Figure 12:
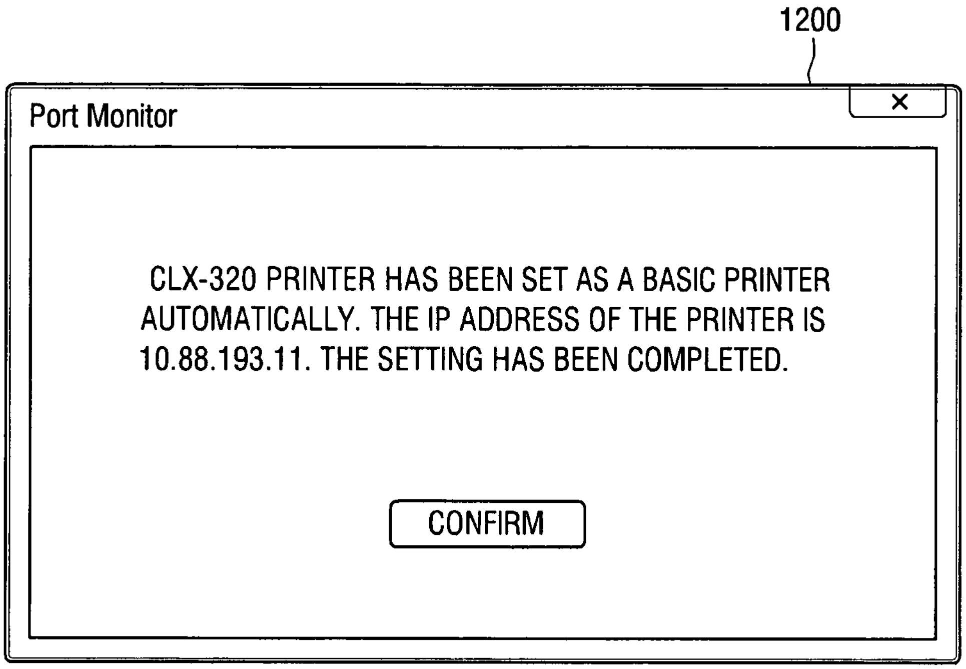

In addition, the user interface unit 220 may display the completion of a setting of a connection with an image forming apparatus. Specifically, if connection with the image forming apparatus is completed, the user interface unit 220 may display that the connection setting is completed through a user interface window. The example of the user interface window is illustrated in FIG. 12.

The storage unit 230 stores information regarding the host device 200, and the storage unit 230 may store a message received from the image forming apparatus 100. The storage unit 230 may store a connection setting for a specific image forming apparatus 100. The storage unit 230 may be realized as an internal storage medium or an external storage medium of the host device 200 such as a removable disk including a USB memory or a web server through a network.

The determination unit 240 determines whether a print job can be performed using the image forming apparatus which sent a search message. Specifically, the determination unit 240 extracts information regarding an image forming apparatus which has the same name as the image forming apparatus in the search message received through the communication interface unit 210 and determines whether a driver installed in the host device 200 can support the image forming apparatus using the extracted information regarding the image forming apparatus.

If it is determined that the image forming apparatus which sent the search message can support the current host device, the determination unit 240 may control the communication interface unit 210 to transmit a response message to the image forming apparatus. However, if it is determined that the image forming apparatus cannot perform a print job, the determination unit 240 may not perform any action.

The setting unit 250 sets the image forming apparatus which sent a connection message as a basic printer of the host device. Specifically, if a connection message to request connection is received from the image forming apparatus 100, the setting unit 250 may change the network IP address and port of the image forming apparatus set in the driver of the driver unit 260 into the IP address and port of the image forming apparatus which sent the connection message and set the image forming apparatus which sent the connection message as a basic printer of the host device by changing an operating system registry of the host device. The driver unit 260 will be explained later.

The driver unit 260 generates print data which can be recognized in the image forming apparatus 100. Specifically, if a print command is received, the driver unit 260 may convert data to be printed according to the input print command into print data which can be recognized in the image forming apparatus that has been set as a basic printer in the above-described operation. The driver unit 260 may include a plurality of drivers and a universal driver which supports a plurality of image forming apparatuses.

The controller 270 may control each component of the host device 200. Specifically, if a search message is received from the image forming apparatus 100, the controller 270 determines whether a print job can be performed using the image forming apparatus 100 which sent the search message. If it is determined that 'the image forming apparatus 100 which sent the search message' can support the print job, the controller 270 may control the communication interface unit 210 to transmit a response message.

If a connection message is received from the image forming apparatus 100, the controller unit 270 may control the setting unit 250 to set 'the image forming apparatus 100 which sent the connection message' as a basic printer of the host device 200. If the image forming apparatus is set as a basic printer, the controller 270 may control the user interface unit 220 to display the setting for a user and may perform the print job using the image forming apparatus if a print command is input.

As described above, the host device 200, according to an exemplary embodiment, may set the image forming apparatus which sent a connection message as a basic printer of the host device 200 in response to a connection message from the image forming apparatus 100. Therefore, a user may set a connection easily from the image forming apparatus and user convenience is enhanced.

As described above, the host device 200, according to an exemplary embodiment, may easily change a basis printer according to a request from the image forming apparatus 100, and thus user convenience is enhanced.

FIG. 4 is a view illustrating a UDP message structure.

Referring to FIG. 4, the UDP message includes a 'UDP source port' 310, a 'UDP destination port' 320, a 'UDP message length' 330, a 'UDP checksum' 340, and a 'DATA' 350.

Herein, the 'UDP source port' 310 is an area where a source port is set, and a random port can be used for a source port.

The 'UDP destination port' 320 is an area where a destination port is set, and a '6000' port may be used as a destination port.

The 'UDP message length' 330 is an area indicating the length of a segment including header and data, and the 'UDP checksum' 340 is an area for UDP message examination and to confirm whether to arrive at a destination.

The 'DATA' 350 is an area to store various messages; and may store message information as illustrated in FIGS. 5 to 8.

Figure 9:
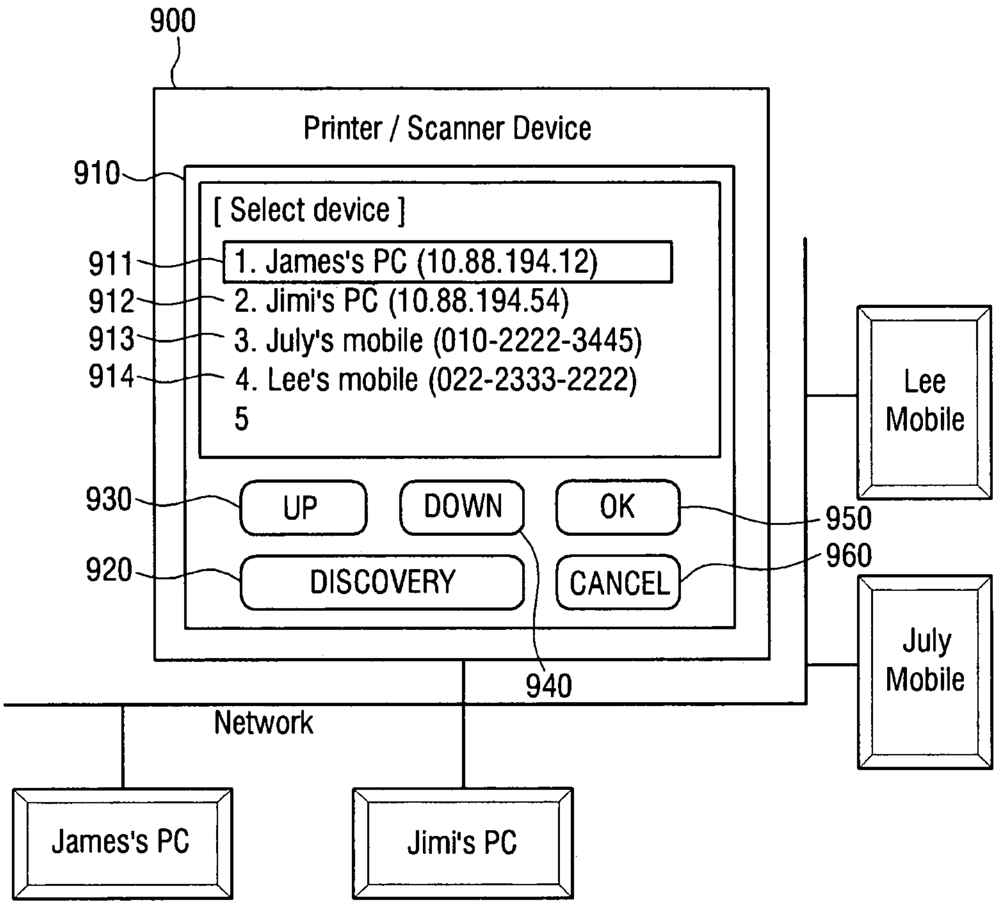
FIG. 9 is a view illustrating an example of a user interface window displayed in the user interface unit in FIG. 2.

FIG. 9 is a view illustrating an example of a user interface window displayed in the user interface unit in FIG. 2.

Referring to FIG. 9, the user interface window 900 may include an area 910 for displaying a searched host device and user manipulation areas 920, 930, 940, 950, and 960.

Specifically, the host device searched by the search unit 140 is displayed in the area 910. If the searched host device is a personal computer, an IP address may be displayed together. Alternatively, if the searched host device is a mobile phone, a telephone number may be displayed.

As the host information that a user is well aware of is displayed on a list, the user may easily set a connection between a host device and an image forming apparatus.

Figure 10:
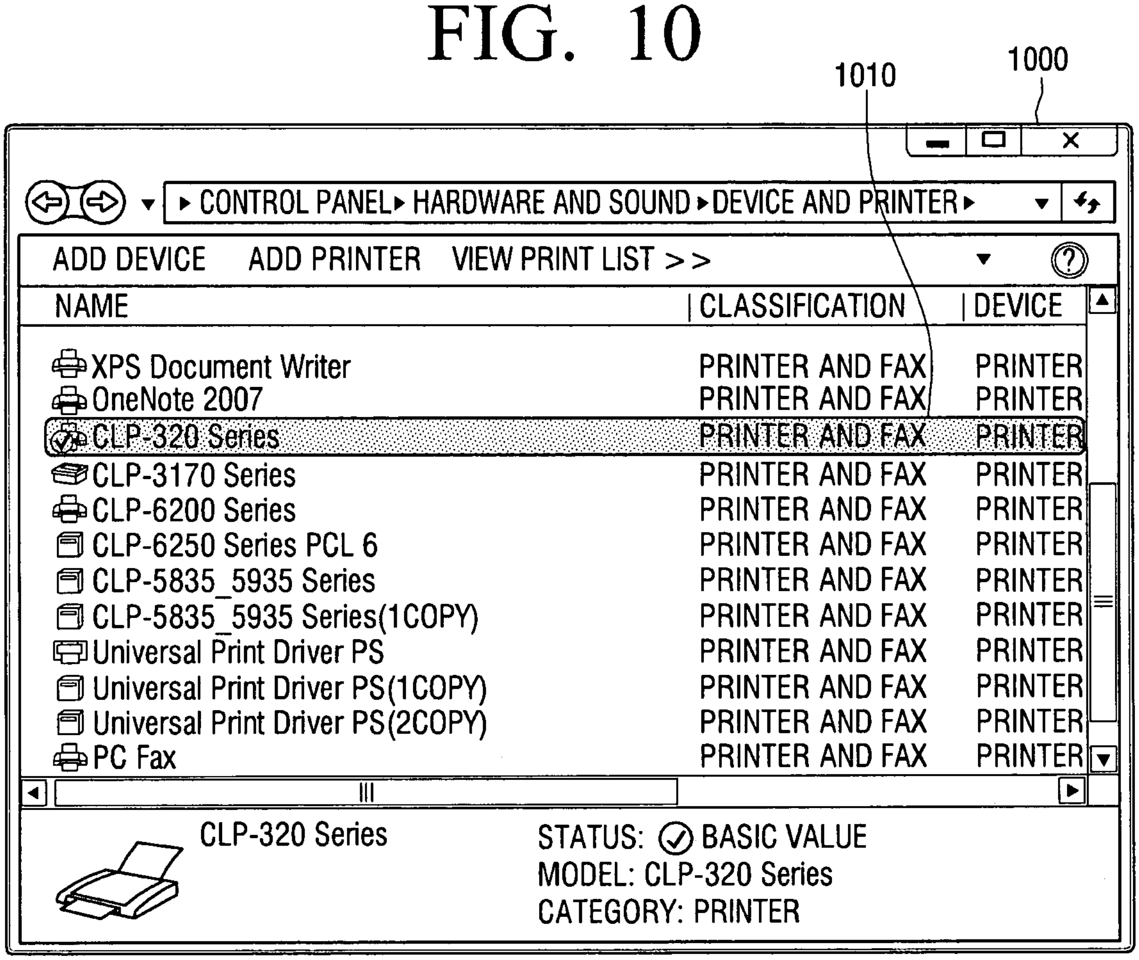
FIGS. 10 to 12 are views illustrating an example of a user interface window displayed in the user interface unit in FIG. 3.
Figure 11:
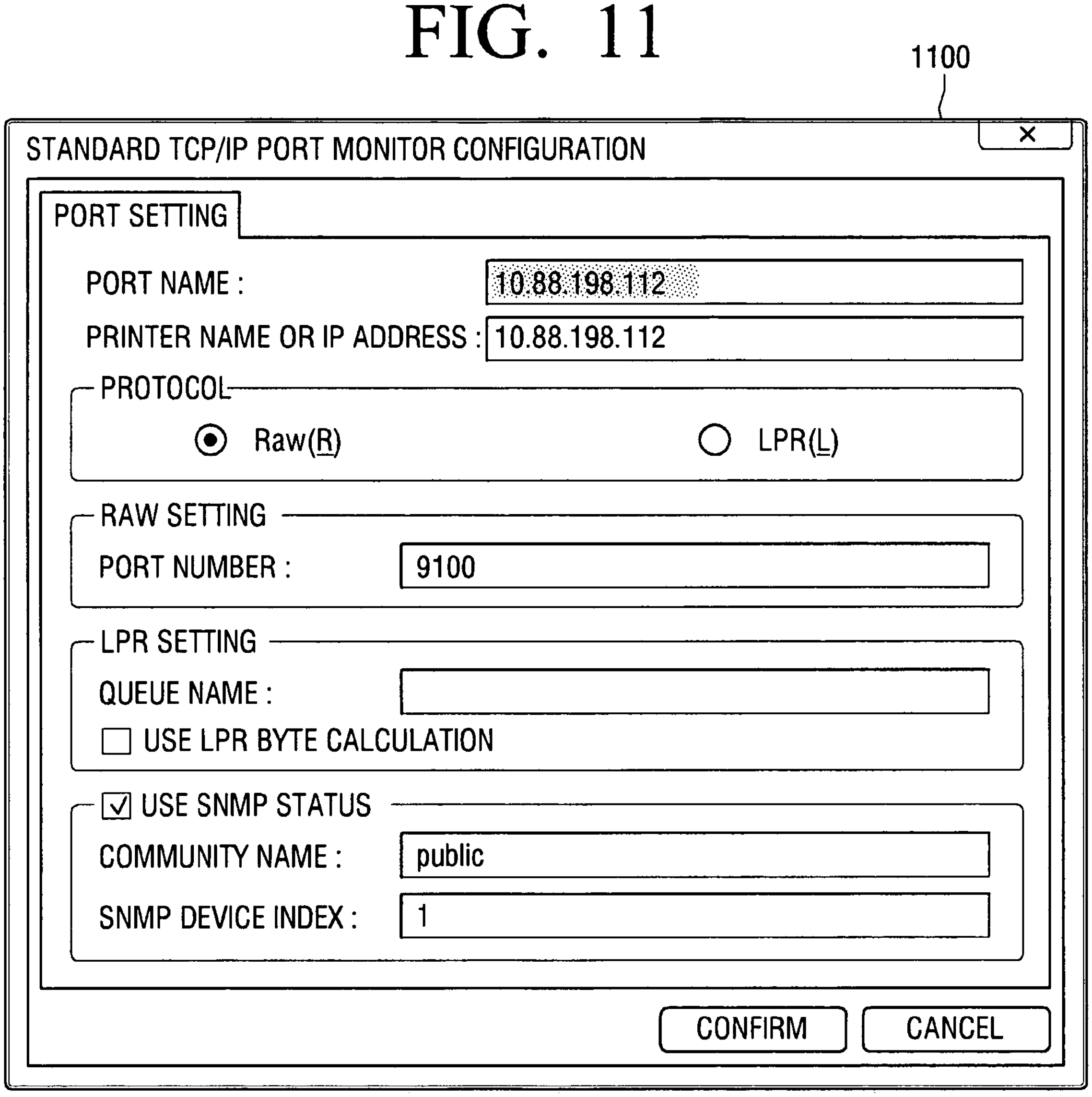

FIGS. 10 to 12 are views illustrating an example of a user interface window displayed in the user interface unit in FIG. 3.

Specifically, FIGS. 10 and 11 are views to check the change in status of an image forming apparatus if the image forming apparatus having the model name of 'CLP-320' sent a connection message. Referring to FIG. 10, it can be seen that the image forming apparatus having the model name of 'CLP-320' is set as a basic printer of a host device. Meanwhile, FIG. 11 illustrates a case in which a universal driver is installed in a host device. Referring to FIG. 11, it can be seen that a printer port in the universal driver is changed into an IP address corresponding to the image forming apparatus having the model name of 'CLP-320'.

FIG. 12 illustrates an example of the user interface window 1200 which is displayed when a connection setting is completed in the host device 200.

Figure 13:
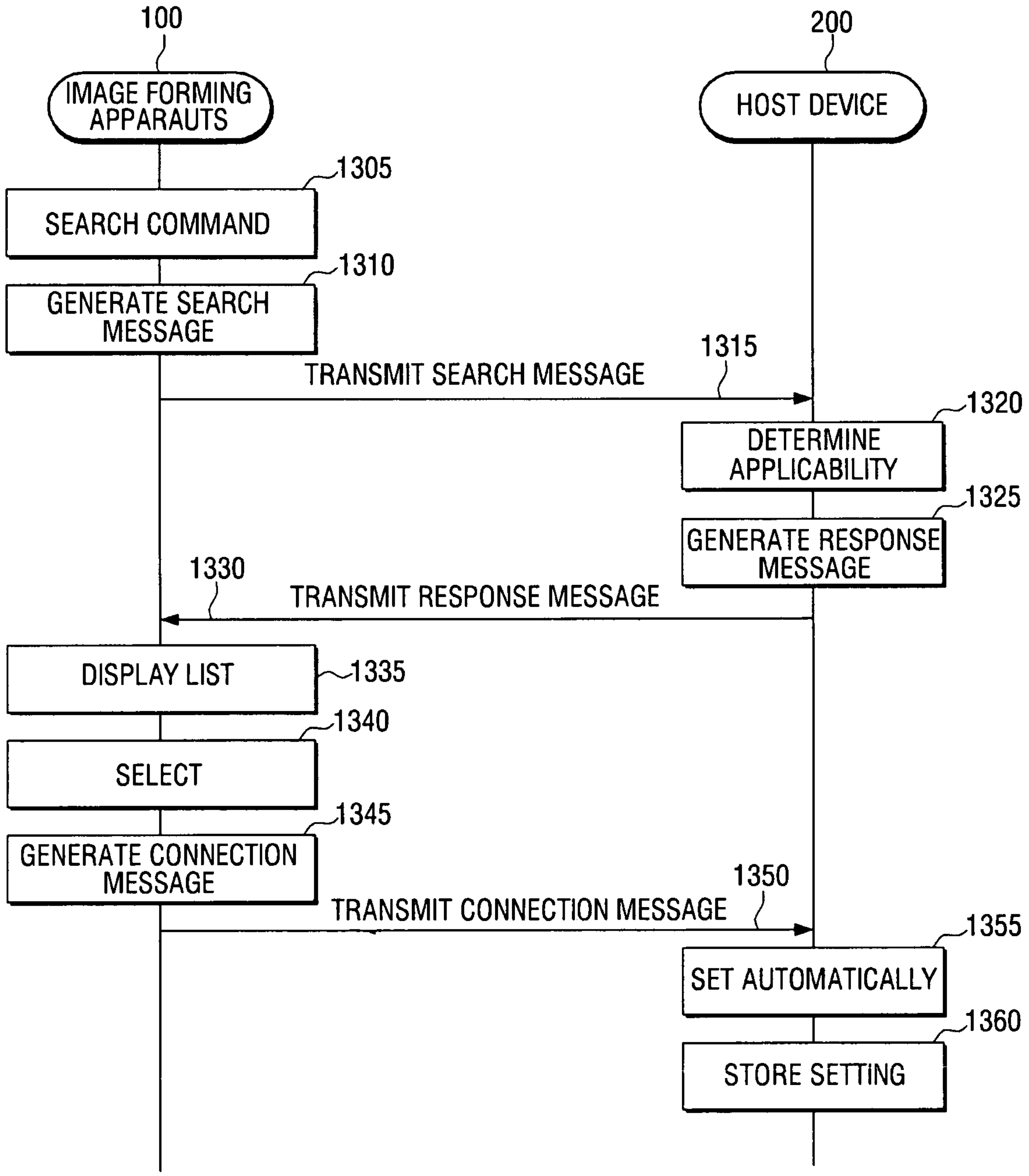
FIG. 13 is a sequence view of a print controlling method according to an exemplary embodiment.

FIG. 13 is a sequence view of a print controlling method according to an exemplary embodiment.

Referring to FIG. 13, if a search command is input from a user (1305), a search message to search a for connectable host device may be generated (1305). The search command may be input through a button, which is formed in an image forming apparatus exclusively for searching a host device.

If the search message is generated, the generated search message may be broadcast (1315).

The host device 200 which receives the search message determines whether a print job can be performed using the image forming apparatus which sent the search message (1320). Specifically, whether or not a print job can be performed may be determined based on whether a driver installed in the host device 200 supports the image forming apparatus 100.

If it is determined that the image forming apparatus which sent the search message can perform the print job, the host device 200 may generate a response message for notifying that the print job can be performed (1325).

The generated response message may be transmitted to 'the image forming apparatus which sent the search message' (1330).

The image forming apparatus 100 which receives the response message displays a list of host devices which sent the response message (1335), and receives selection of a host device to be connected from among the displayed host devices from a user (1340). If the host device to be connected is selected by a user, a connection message for requesting connection with the selected host device is generated (1345), and the generated connection message is transmitted to the host device selected by the user (1350).

The host device 200 which receives the connection message may set 'the image forming apparatus which sent the connection message' as a basic or default printer of the host device (1355) and store the setting (1360).

As described above, according to a print controlling method in an exemplary embodiment, connectable host devices are searched from the image forming apparatus 100 and one host device may be selected using the name or telephone number of the host device that the image forming apparatus is aware of, from among the searched host devices. Therefore, user convenience is improved. The print controlling method in FIG. 13 may be performed in an image forming apparatus or a host device having the structure illustrated in FIG. 2 or FIG. 3, and may also be performed in an image forming apparatus or a host device having other structures.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
- an image forming unit to form an image;
- a search unit which broadcasts a search message for searching for a connectable host device;
- a communication interface unit to receive a response message for notifying that a print job is executable from host devices in response to the search message;
- a user interface unit to display host devices corresponding to the received response message and receives a selection from a user regarding a host device to be connected from among the displayed host devices; and
- a controller to control the communication interface unit to transmit a connection message for requesting a connection with the image forming apparatus to the selected host device.

2. The image forming apparatus as claimed in claim 1, wherein the search message comprises model information and network address information of the image forming apparatus.

3. The image forming apparatus as claimed in claim 1, wherein the response message comprises at least one of a telephone number, an apparatus name and user name of a host device or combination thereof.

4. The image forming apparatus as claimed in claim 1, wherein the connection message comprises a command to set the image forming apparatus as a default printer of the selected host device.

5. The image forming apparatus as claimed in claim 1, wherein at least one of the search message, the response message and the connection message comprise a user datagram protocol (UDP).

6. The image of claim 5, wherein the UDP comprises:
- any one of an UDP destination port, UDP message length, UDP checksum, and data or combination thereof.

7. The image forming apparatus of claim 1, further comprising:
- a storage unit to store information regarding the host device.

8. A host device which is connectable to an image forming, the host device, comprising:
- a communication interface unit which receives a search message for requesting information regarding the host device from an image forming apparatus;
- a determination unit which determines whether it is possible to perform a print job using the image forming apparatus which sent the search message; and
- a controller which controls a communication interface unit to transmit a response message including information regarding the host device to the image forming apparatus according to the determination result.

9. The host device as claimed 8, further comprising:
- a setting unit to set the image forming apparatus as a default printer of the host device if a connection message for requesting connection is received from the image forming apparatus.

10. The host device as claimed in claim 8, wherein the determination unit determines whether it is possible to perform a print job based on whether a driver installed in the host device supports the image forming apparatus.

11. The host device as claimed in claim 8, further comprising:
- a driver unit which generates print data that is recognizable in the image forming apparatus if a print command is received,
- wherein the controller controls the communication interface unit to transmit the generated print data to the image forming apparatus.

12. The host device as claimed in claim 8, further comprising:
- a user interface unit which, if a connection message for requesting connection is received from the image forming apparatus, displays a message for notifying that there is a connection request and receives a selection regarding whether to connect to the image forming apparatus from a user, wherein the setting unit sets the image forming apparatus as a default printer of the host device and automatically sets a network IP address and port of an image forming apparatus set in a driver, according to the connection result.

13. A print controlling method in an image forming apparatus, the method comprising:

broadcasting a search message to search for a connectable host device;

receiving a response message for notifying that it is possible to perform a print job from host devices in response to the search message;

displaying host devices corresponding to the received response message;

receiving a selection regarding a host device to be connected from among the displayed host devices; and transmitting a connection message for requesting connection to the image forming apparatus to the selected host device.

14. The method as claimed in claim 13, wherein the search message comprising at least one of model information and network address information of the image forming apparatus.

15. The method as claimed in claim 13, wherein the response message comprising at least one of network address information, apparatus name and user name of a host device.

16. The method as claimed in claim 13, wherein the connection message comprising a command to set the image forming apparatus as a basic (default) printer of the selected host device.

17. The method as claimed in claim 13, wherein at least one of the search message, the response message and the connection message is comprising a user datagram protocol (UDP).

18. The method as claimed in claim 17, wherein the UDP comprises:

any one of an UDP source port, UDP destination port, UDP message length, UDP check sum, and data, or combination thereof.

19. A print controlling method in a host device connectable to an image forming apparatus, the method comprising:

receiving a search message for requesting information regarding the host device from the image forming apparatus;

determining whether it is possible to perform a print job using an image forming apparatus which sent the search message;

transmitting a response message including information regarding the host device to the image forming apparatus according to the determination result; and setting the image forming apparatus as a default printer of the host device if a connection message for requesting connection is received from the image forming apparatus.

20. The method as claimed in claim 19, wherein the determining comprises determining whether it is possible to perform a print job based on whether a driver installed in the host device supports the image forming apparatus.

21. The method as claimed in claim 19, further comprising:

generating print data that is recognizable in the image forming apparatus if a print command is received, and transmitting the generated print data to the image forming apparatus.

22. The method as claimed in claim 19, further comprising:

if a connection message for requesting connection is received from the image forming apparatus, displaying a message for notifying that there is a connection request and receiving a selection regarding whether to connect to the image forming apparatus, wherein the setting comprises setting the image forming apparatus as a default printer of the host device and automatically setting a network IP address and port of an image forming apparatus set in a driver, according to the connection result.

* * * * *

UNITED STATES PATENT AND TRADEMARK OFFICE

CERTIFICATE OF CORRECTION

| | |
|---|---|
| PATENT NO. | : 8,761,615 B2 |
| APPLICATION NO. | : 12/926566 |
| DATED | : June 24, 2014 |
| INVENTOR(S) | : Dong-hoon Lee |

It is certified that error appears in the above-identified patent and that said Letters Patent is hereby corrected as shown below:

In the Claims

Column 10, Line 23, in Claim 6, delete "image" insert -- image forming apparatus --.

Column 10, Line 43, in Claim 9, after "claimed" insert -- in claim --.

Signed and Sealed this
Fourth Day of November, 2014

Michelle K. Lee

Michelle K. Lee
*Deputy Director of the United States Patent and Trademark Office*